United States Patent
Wang et al.

(10) Patent No.: US 12,189,492 B2
(45) Date of Patent: Jan. 7, 2025

(54) METHOD, ELECTRONIC DEVICE, AND COMPUTER PROGRAM PRODUCT FOR ADJUSTING PERFORMANCE OF BLOCK STORAGE SYSTEM

(71) Applicant: DELL PRODUCTS L.P., Round Rock, TX (US)

(72) Inventors: Cheng Wang, Beijing (CN); Bing Liu, Tianjin (CN)

(73) Assignee: DELL PRODUCTS L.P., Round Rock, TX (US)

( * ) Notice: Subject to any disclaimer, the term of this patent is extended or adjusted under 35 U.S.C. 154(b) by 99 days.

(21) Appl. No.: 18/295,933

(22) Filed: Apr. 5, 2023

(65) Prior Publication Data

US 2024/0281340 A1    Aug. 22, 2024

(30) Foreign Application Priority Data

Feb. 17, 2023  (CN) .......................... 202310153654.7

(51) Int. Cl.
*G06F 11/14* (2006.01)
*G06F 11/30* (2006.01)
*G06F 11/34* (2006.01)

(52) U.S. Cl.
CPC ...... *G06F 11/1461* (2013.01); *G06F 11/3034* (2013.01); *G06F 11/3075* (2013.01); *G06F 11/3409* (2013.01)

(58) Field of Classification Search
CPC ............ G06F 11/1461; G06F 11/3034; G06F 11/3075; G06F 11/3409
See application file for complete search history.

(56) References Cited

U.S. PATENT DOCUMENTS

| 11,775,186 B1 * | 10/2023 | Setter | G06F 3/0604 |
| | | | 711/100 |
| 2005/0010677 A1 * | 1/2005 | Krissell | H04L 67/1095 |
| | | | 709/232 |

(Continued)

FOREIGN PATENT DOCUMENTS

WO    WO-2023177703 A1 *   9/2023    ............. G06F 9/505

OTHER PUBLICATIONS

I. Ong and H. Lim, "Dynamic Load Balancing and Network Monitoring in iATA Protocol for Mobile Appliances," 2010 4th International Conference on Multimedia and Ubiquitous Engineering, Cebu, Philippines, 2010, pp. 1-4 (Year: 2010).*

*Primary Examiner* — Matthew M Kim
*Assistant Examiner* — Indranil Chowdhury
(74) *Attorney, Agent, or Firm* — WOMBLE BOND DICKINSON (US) LLP

(57) ABSTRACT

A method includes monitoring a first input/output (I/O) load set of the block storage system within a first time period and a second I/O load set within a second time period, wherein the block storage system is configured to back up and restore data in a client and has preconfigured predetermined thresholds. The method further includes determining a change of an I/O load of the block storage system based on the first I/O load set and the second I/O load set. The method further includes determining, based on the change of the I/O load, that an I/O load within a third time period reaches a first predetermined threshold. The method further includes adjusting I/O performance of the block storage system based on the I/O load within the third time period in response to determining that the I/O load within the third time period reaches the first predetermined threshold.

20 Claims, 7 Drawing Sheets

(56) References Cited

U.S. PATENT DOCUMENTS

| | | | |
|---|---|---|---|
| 2011/0185120 A1* | 7/2011 | Jess | G06F 11/3433 |
| | | | 711/E12.016 |
| 2014/0358479 A1* | 12/2014 | Nazari | G06F 3/0605 |
| | | | 702/183 |
| 2014/0372607 A1* | 12/2014 | Gladwin | G06F 3/067 |
| | | | 709/224 |
| 2018/0210754 A1* | 7/2018 | Vaish | G06F 9/5011 |
| 2019/0297140 A1* | 9/2019 | Mason | H04L 67/1029 |
| 2019/0310920 A1* | 10/2019 | Rybczyk | G06F 11/1456 |
| 2019/0332280 A1* | 10/2019 | Bernal | G06F 3/0616 |
| 2020/0285545 A1* | 9/2020 | Ashokkumar | H04L 67/1095 |
| 2020/0401343 A1* | 12/2020 | Lan | G06F 3/067 |
| 2022/0327030 A1* | 10/2022 | Appireddygari Venkataramana | G06F 11/0772 |
| 2023/0136226 A1* | 5/2023 | Mo | G06F 9/5022 |
| | | | 718/104 |
| 2024/0281343 A1* | 8/2024 | Liu | G06F 11/1469 |

\* cited by examiner

METHOD, ELECTRONIC DEVICE, AND COMPUTER PROGRAM PRODUCT FOR ADJUSTING PERFORMANCE OF BLOCK STORAGE SYSTEM

CROSS-REFERENCE TO RELATED APPLICATION

This patent application claims priority, under 35 U.S.C. § 119, of Chinese Patent Application No. 202310153654.7, filed Feb. 17, 2023, which is incorporated by reference in its entirety.

TECHNICAL FIELD

Embodiments of the present disclosure relate to the field of computers, and more specifically, relate to a method, an electronic device, and a computer program product for adjusting performance of a block storage system.

BACKGROUND

With development of data storage technologies, data protection products running in a public cloud can use a block storage service to keep metadata in a persistent manner. An input/output (I/O) function in the block storage service has been carefully designed to support most working load modes. However, in a production environment, some workload may cause I/O spikes, and then bring data protection product pressure to disks of some data protection products that store metadata. In a case of extremely huge I/O, the service can even be interrupted to protect the disks in the block storage system.

SUMMARY OF THE INVENTION

Embodiments of the present disclosure provide a method, an electronic device, and a computer program product for adjusting performance of a block storage system.

According to a first aspect of the present disclosure, a method for adjusting performance of a block storage system is provided. The method includes monitoring a first input/output (I/O) load set of the block storage system within a first time period and a second I/O load set of the block storage system within a second time period, where the block storage system is configured to back up and restore data in a client and has preconfigured predetermined thresholds. The method further includes determining a change of an I/O load of the block storage system based on the first I/O load set and the second I/O load set. The method further includes determining, based on the change of the I/O load, that an I/O load within a third time period reaches a first predetermined threshold. The method further includes adjusting I/O performance of the block storage system based on the I/O load within the third time period in response to determining that the I/O load within the third time period reaches the first predetermined threshold.

According to a second aspect of the present disclosure, an electronic device is further provided. The electronic device includes a processor and a memory coupled to the processor, wherein the memory has instructions stored therein, and the instructions, when executed by the processor, cause the device to execute actions. The actions include monitoring a first I/O load set of a block storage system within a first time period and a second I/O load set of the block storage system within a second time period, where the block storage system is configured to back up and restore data in a client and has preconfigured predetermined threshold. The actions further include determining a change of an I/O load of the block storage system based on the first I/O load set and the second I/O load set. The actions further include determining, based on the change of the I/O load, that an I/O load within a third time period reaches a first predetermined threshold. The actions further include adjusting I/O performance of the block storage system based on the I/O load within the third time period in response to determining that the I/O load within the third time period reaches the first predetermined threshold.

According to a third aspect of the present disclosure, a computer program product is provided. The computer program product is tangibly stored on a computer-readable medium and includes computer-executable instructions, wherein the computer-executable instructions, when executed by a device, cause the device to perform a method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
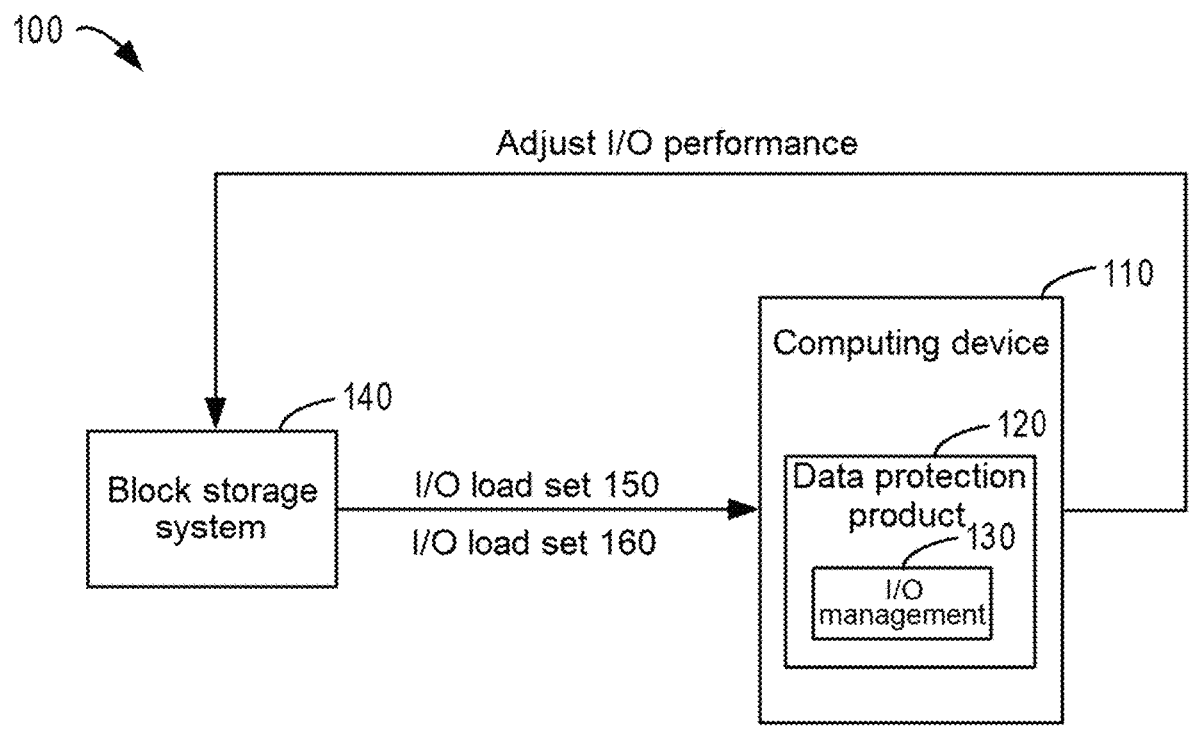
FIG. 1 is a schematic diagram of an example environment in which embodiments of the present disclosure can be implemented.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

In the field of data storage, a user may store data, back up important data, or restore damaged data in a cloud end by means of data protection products, even including data deduplication, data integrity maintenance, data encryption, and so on. In a public cloud, backup and other tasks improve an input/output (I/O) load of a block storage system. If backup or restoring tasks are performed at the same time or separately but the amount of data is large, an I/O spike of the block storage system will be caused. When the I/O spike is too large and exceeds the load capacity of the block storage system, it will lead to poor performance of the data protection product or even system crash.

Generally, users may reconfigure the data protection product with a higher model of virtual hardware, but this method consumes a large amount of resources for users. If I/O pressure lasts for a short time, to reconfigure the data protection product with a higher model of virtual hardware is not a good method. For example, upgrading a disk type of block storage or using a higher model of data protection product will still consume user resources without I/O spike. Because it is irreversible to reconfigure to higher virtual hardware, if I/O pressure is temporary and only occurs for a very short time, it is not necessary to upgrade the entire data protection product and block storage system.

In the study, it was found that the data backup service or data recovery service of customers in some traditional fields is a routine task, so it is relatively regular, for example, it occurs in the early morning of the weekend every week. However, some other customers may be in some new areas, so their data backup or data recovery service is not regular, and may be mixed with traditional backup service and other new services, so there is no rule, and it is difficult to determine the spike and time of an I/O load of the block storage system.

In view of this, the present disclosure provides a method for adjusting performance of a block storage system. The method can monitor I/O loads in real time and adjust the I/O scales of each disk as required. For example, within a given time interval, if the number of Input/Output Operations Per Second (IOPS) of a single disk reaches a predetermined threshold in a specified time, its IOPS can be increased. After that, if the IOPS of the disk is lower than the predetermined threshold within the given time interval, the IOPS value can be adjusted back to a baseline.

In this way, even if the I/O load is irregular, it can still help the data protection product effectively handle I/O spikes without affecting system performance. In addition, compared with reconfiguring the data protection products to a higher model, customers consume fewer resources. In addition, it also prevents data unavailability (DU), so the service will not be interrupted during the entire I/O spike and disk I/O expansion/reduction process.

FIG. 1 is a schematic diagram of example environment 100 in which embodiments of the present disclosure can be implemented. In environment 100, computing device 110 (for example, a computing system or a server) is installed with data protection product 120. Data protection product 120 is connected to block storage system 140. Data protection product 120 includes I/O management module 130. I/O management module 130 may monitor an I/O load of block storage system 140.

I/O management module 130 may analyze real-time I/O loads and calculate a change of the I/O loads. The I/O load of block storage system 140 may be divided into several segments in the order of time, for example, I/O load 150 within a first time period and I/O load 160 within a second time period. I/O load 150 and I/O load 160 can be analyzed separately or jointly. In some embodiments, I/O management module 130 may analysis results according to the I/O load so as to determine whether to expand or reduce I/O performance of disks of block storage system 140 to adapt to possible arrival of I/O spikes.

If I/O management module 130 decides to expand or reduce I/O performance of the disks of block storage system 140, I/O capability can be determined based on a predicted result, and the I/O capability can satisfy needs of future I/O spikes. I/O management module 130 can send the I/O capability together with instructions to block storage system 140 for adjusting the I/O performance of block storage system 140.

Figure 2:
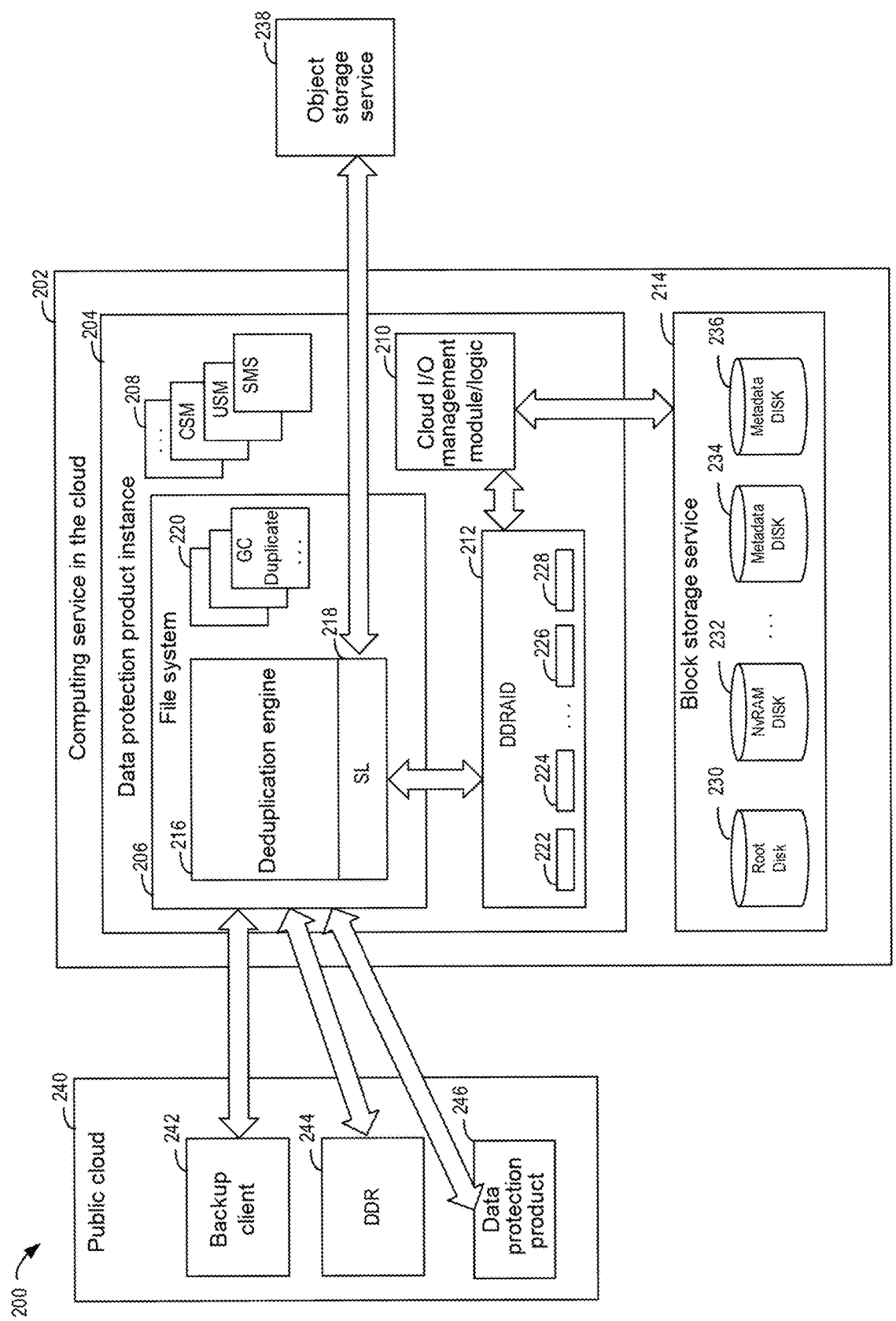
FIG. 2 schematically shows a schematic diagram of a product framework according to an example implementation of the present disclosure.

FIG. 2 schematically shows a schematic diagram of product framework 200 according to an example implementation of the present disclosure. As shown in FIG. 2, product framework 200 is included in public cloud 240. In public cloud 240, some services can be included, for example, data protection product 246. Public cloud 240 may also include services such as backup client 242 and Double Data Rate Synchronous Dynamic Random Memory DDR 244.

In some embodiments, data protection product 246 can be run in a virtual machine of public cloud 240. Public cloud 240 may also provide computing service 202. Computing service 202 includes data protection product instance 204. Data protection product instance 204 includes file system 206. File system 206 also includes deduplication engine 216. Deduplication engine 216 is used to analyze and identify whether data of a user is duplicate, make duplicate data into metadata, and store the metadata in object storage service 238. The de-duplicated user data is saved to Distributed Data Redundant Array of Independent Disk DDRAID 212 via storage layer (SL) 218. For security, the user data and the metadata can also be stored in object storage service 238.

DDRAID 212 includes multiple block storage services, for example, block storage service 222, block storage service 224, block storage service 226, and block storage service 228. Each block storage service has a different disk type. As an example, block storage service 214 shows details of disk types of block storage services. Block storage service 222 corresponds to root disk 230. Block storage service 224 corresponds to nonvolatile random access memory (NvRAM) disk 232. Block storage service 226 corresponds to metadata disk 234. Block storage service 228 corresponds to metadata disk 236.

In some embodiments, data protection product instance 204 may include cloud I/O management module/logic 210. Cloud I/O management module/logic 210 may be connected to DDRAID 212 and block storage service 214. Cloud I/O management module/logic 210 may be used to analyze I/O loads of the block storage system, determine the I/O capability, and send instructions for adjusting I/O performance.

Figure 3:
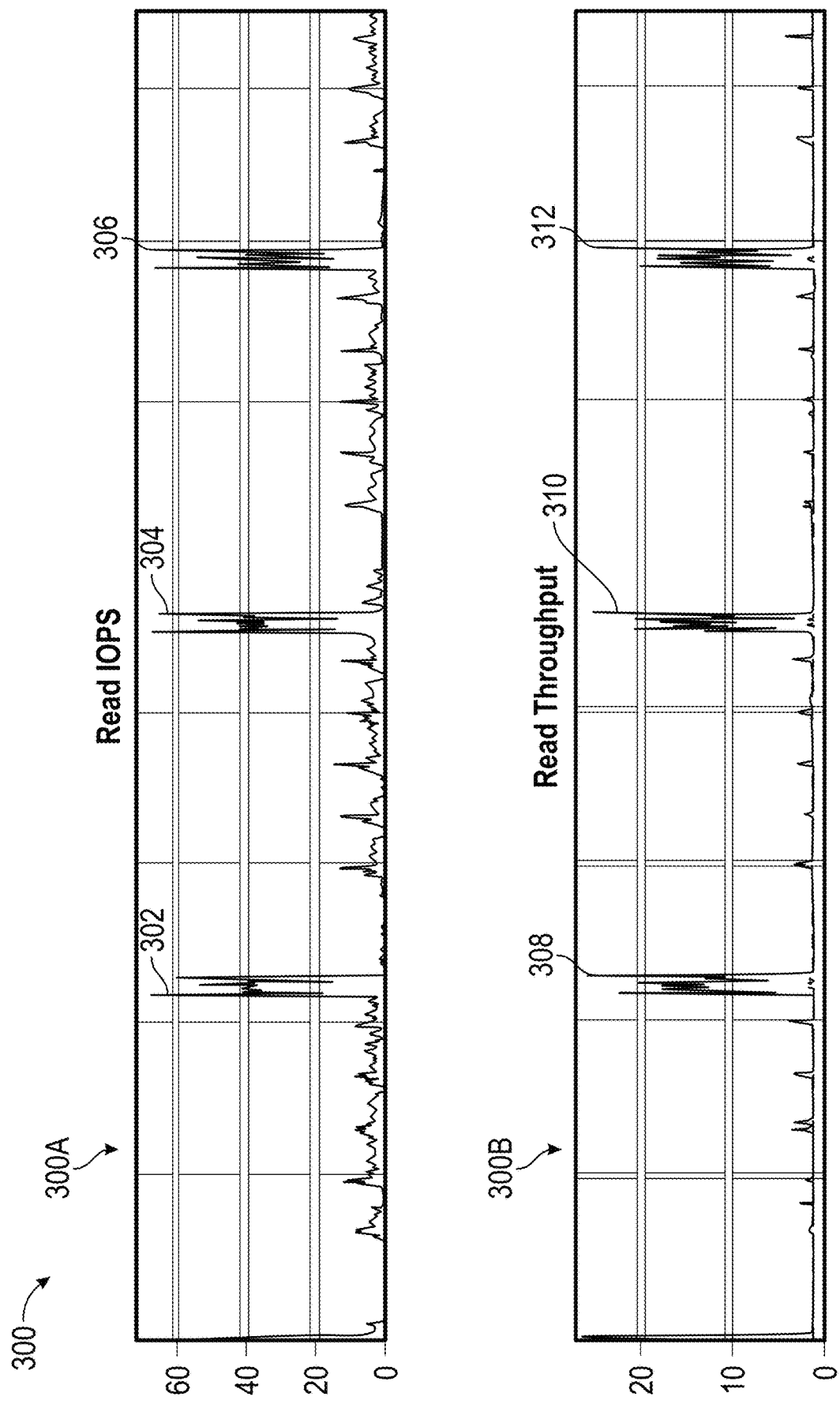
FIG. 3 schematically shows a schematic diagram of regular I/O statistics according to an example implementation of the present disclosure.
Figure 3:
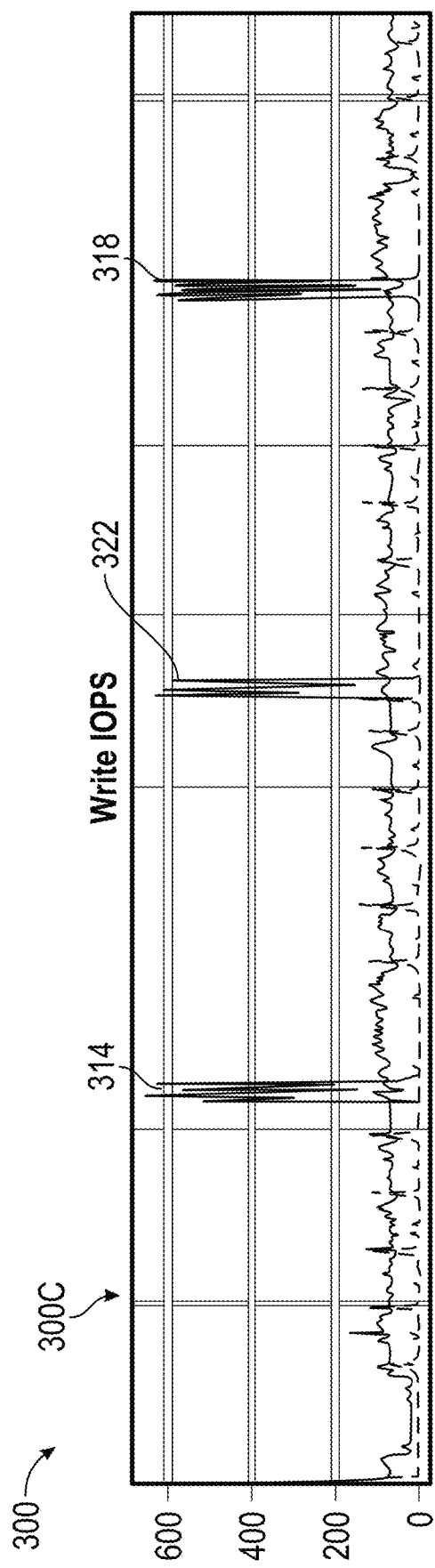
Figure 3:
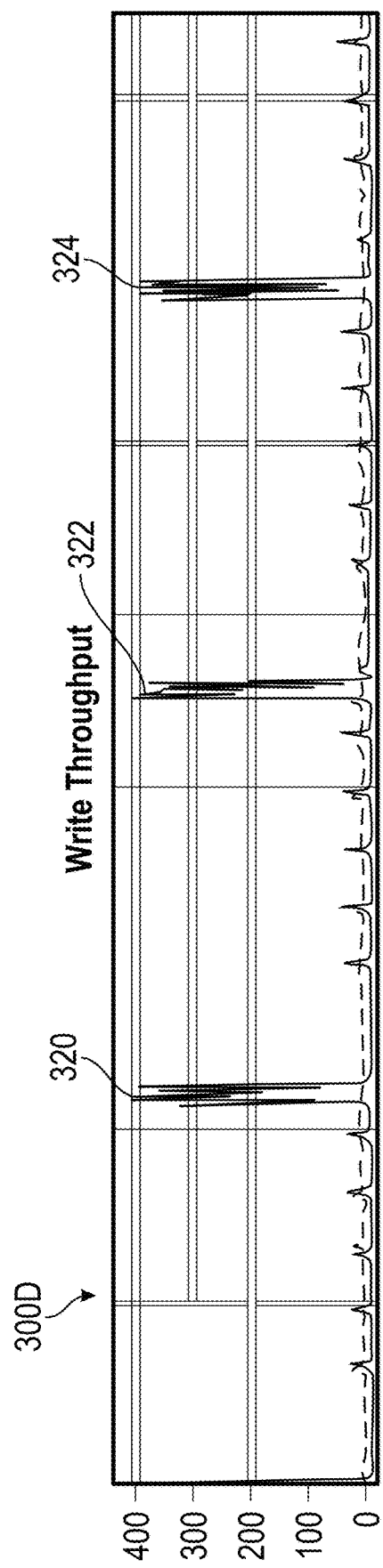

FIG. 3 schematically shows a schematic diagram of regular I/O statistics 300 according to an example implementation of the present disclosure. Characteristics of backup activities can be seen from FIG. 3: high I/O pressure on weekends and low I/O load on weekdays.

Curve 300A shows changes of READ IOPS of user backup tasks. I/O spikes appear at 302, 304, and 306, and appearances of I/O spikes are all on the weekend of each week and are relatively regular.

Curve 300B shows changes of READ THROUGHPUT of user backup tasks. I/O spikes appear at 308, 310, and 312, and appearances of I/O spikes are relatively regular and are consistent with curve 300A.

Curve 300C shows changes of WRITE IOPS of user backup tasks. It can be seen that spike 314, spike 316, and spike 318 appear regularly, consistent with curves 300A and 300B, and concentrated on the weekend of each week.

Curve 300D shows changes of WRITE THROUGHPUT of user backup tasks. It can be seen that the laws of spike 320, spike 322, and spike 324 are consistent with curves 300A, 300B, and 300C, and concentrated on the weekend of each week.

Figure 4:
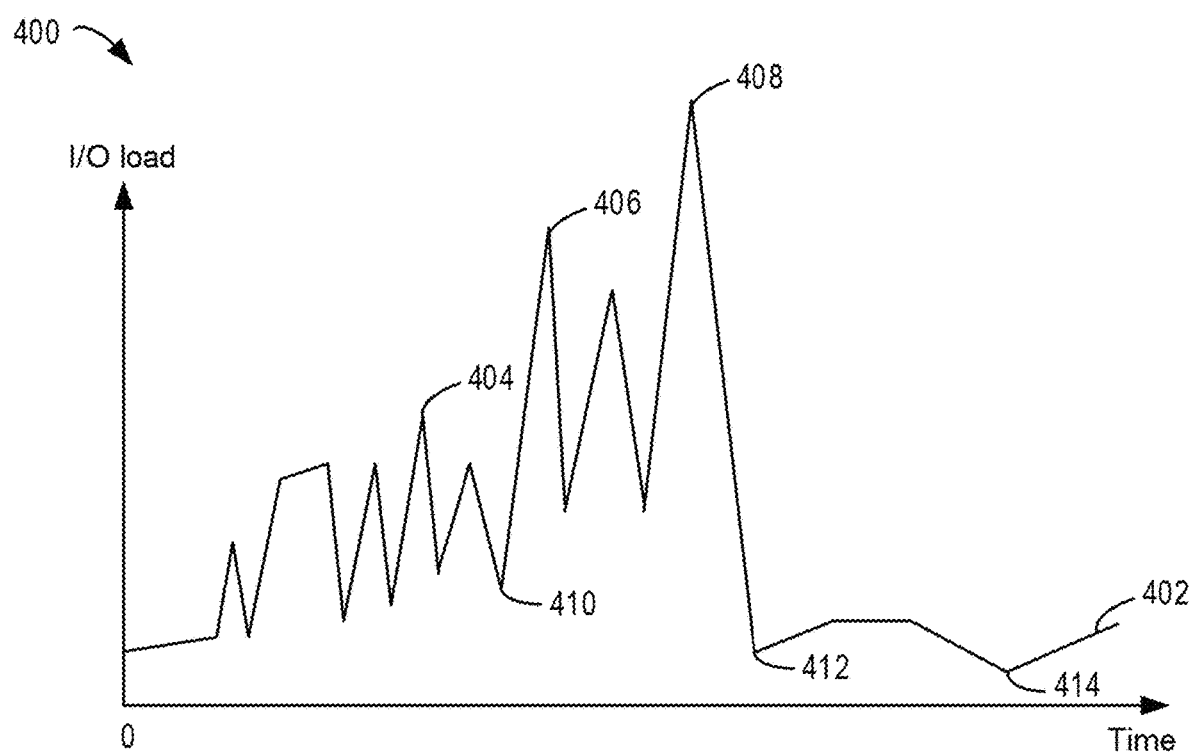
FIG. 4 schematically shows a schematic diagram of irregular I/O statistics according to an example implementation of the present disclosure.

FIG. 4 schematically shows a schematic diagram of irregular I/O statistics 400 according to an example implementation of the present disclosure. Some irregular I/O loads were also observed in the study. As shown in FIG. 4, spike 404 and spike 406 of I/O loads shown in curve 402 are local spikes, and a global spike needs several oscillations before it appears at spike 408. When the I/O loads are the lowest, for example, at 410, 412, and 414, some troughs periodically appear. In general, for I/O loads having shapes similar to that of curve 402, future I/O loads are hard to be predicted based on historical I/O loads.

Figure 5:
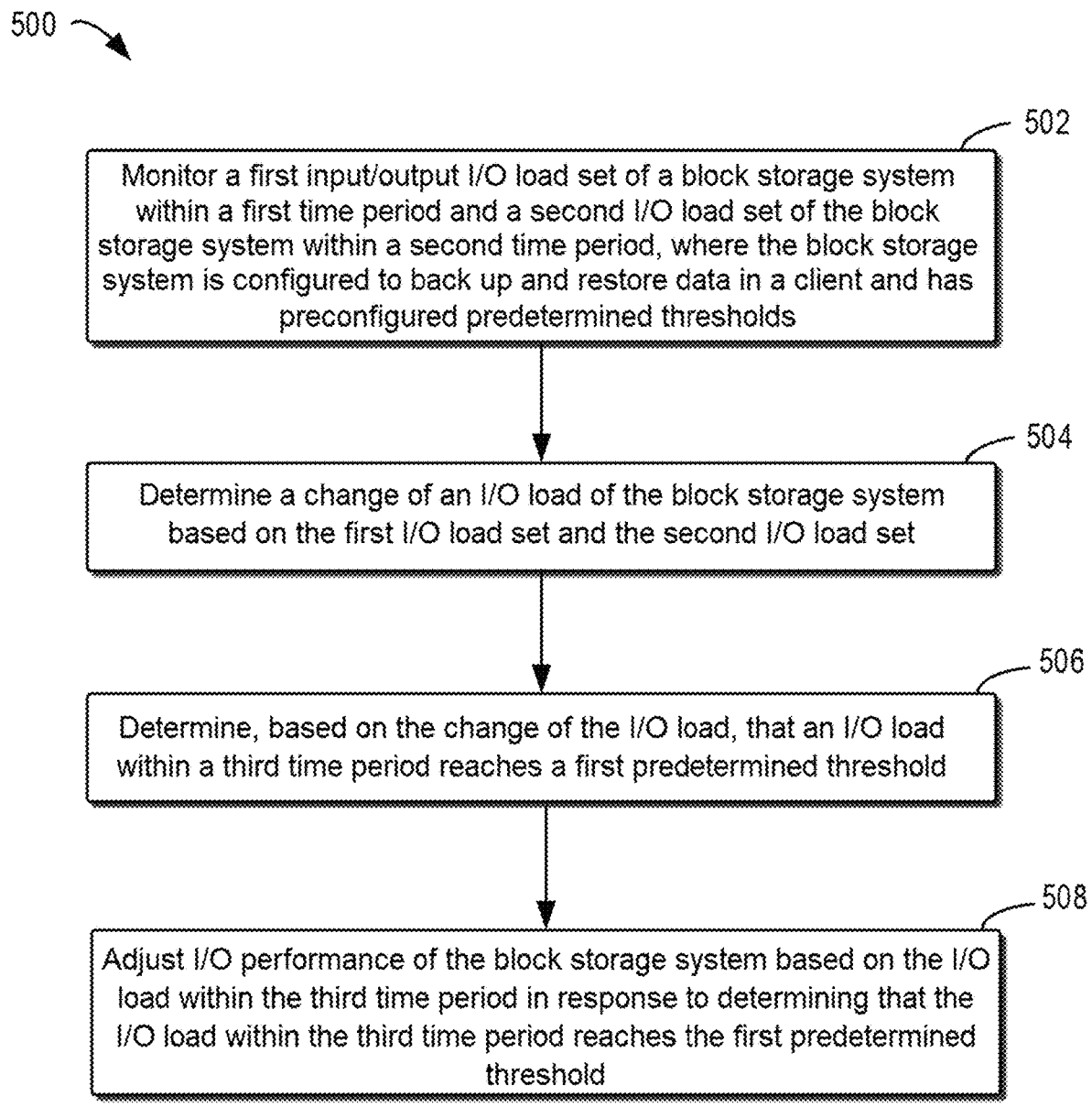
FIG. 5 schematically shows a flow chart of a method for adjusting performance of a block storage system according to an example implementation of the present disclosure.

FIG. 5 schematically shows a flow chart of method 500 for adjusting performance of a block storage system according to an example implementation of the present disclosure. Method 500 will be described below with reference to FIGS. 1 and 5.

At block 502, I/O load set 150 (which is also referred to as a first I/O load set) of block storage system 140 within a first time period and I/O load set 160 (which is also referred to as a second I/O load set) of block storage system 140 within a second time period are monitored. Block storage system 140 is used to back up and restore data in a client and has preconfigured predetermined thresholds. As an example, data protection product 120 is connected to block storage system 140. I/O management module 130 in data protection product 120 can monitor I/O load set 150 and I/O load set 160. In some embodiments, an I/O load may include Input/Output Operations Per Second (IOPS). In some embodiments, the I/O load may include I/O throughput.

In some embodiments, I/O load set 150 or I/O load set 160 may include an I/O load for each disk. For example, suppose block storage system 140 includes 2 disks, which are respectively referred to as disk A and disk B. Then, I/O load set 150 may be understood as including an I/O load of disk A within the first time period and including an I/O load of disk B within the first time period. Similarly, I/O load set 160 may be understood as including an I/O load of disk A within the second time period and including an I/O load of disk B within the second time period.

In some embodiments, monitoring I/O load set 150 and I/O load set 160 may include: monitoring I/O load sets of all disks of block storage system 140 within the first time period, for example, monitoring an I/O load set of disk A and an I/O load set (which is also referred to as a third I/O load set) of disk B of block storage system 140 within the first time period. It can be understood that the third I/O load set is a subset of the first I/O load set.

In some embodiments, I/O management module 130 may monitor a fourth I/O load set of each disk within the second time period. For example, I/O management module 130 may monitor an I/O load set of disk A and an I/O load set (which is also referred to as a fourth I/O load set) of disk B of block storage system 140 within the second time period. It can be understood that the fourth I/O load set is a subset of the second I/O load set.

In some embodiments, I/O management module 130 may determine a change of an I/O load of each disk based on the third I/O load set and the fourth I/O load set, and adjust I/O performance of each disk based on the change of the I/O load of each disk. As an example, I/O management module 130 may choose disk A in block storage system 140, monitor disk A, and obtain the third I/O load set within the first time period and the fourth I/O load set within the second time period. I/O management module 130 may determine the change of the I/O load for disk A based on the third I/O load set and the fourth I/O load set. I/O management module 130 may adjust the I/O performance for disk A based on the change of the I/O load of disk A.

In some embodiments, I/O management module 130 may also monitor disk B while monitoring disk A. As an example, I/O management module 130 may choose disk B in block storage system 140, monitor disk B, and obtain the third I/O load set within the first time period and the fourth I/O load set within the second time period. I/O management module 130 may determine the change of the I/O load for disk B based on the third I/O load set and the fourth I/O load set. I/O management module 130 may adjust the I/O performance for disk B based on the change of the I/O load of disk B.

In some embodiments, I/O management module 130 may iteratively choose different disks in block storage system 140 for monitoring. For example, suppose besides disk A and disk B, block storage system 140 also includes disk C and disk D. For example, I/O management module 130 may choose disk C in block storage system 140, monitor disk C, and obtain the third I/O load set within the first time period and the fourth I/O load set within the second time period. I/O management module 130 may determine a change of an I/O load of disk C based on the third I/O load set and the fourth I/O load set. I/O management module 130 may adjust I/O performance for disk C based on the change of the I/O load of disk C. Concurrently or sequentially, I/O management module 130 may choose disk D in block storage system 140, monitor disk D, and obtain the third I/O load set within the first time period and the fourth I/O load set within the second time period. I/O management module 130 may determine a change of an I/O load of disk D based on the third I/O load set and the fourth I/O load set. I/O management module 130 may adjust I/O performance for disk D based on the change of the I/O load of disk D.

At block 506, it is determined, based on the change of the I/O load, that an I/O load within a third time period reaches a first predetermined threshold. For example, the third time period can be understood as a time period representing the future. The I/O load within the third time period reaching the first predetermined threshold indicates that a predicted I/O load having I/O loads that current block storage system 140 cannot meet will appear within the third time period. In some embodiments, this critical value of the I/O load that is difficult to meet can be predefined as a first pre-determined threshold. Therefore, it is necessary to adjust the I/O performance of block storage system 140 before the third time period to meet the spike of I/O load that may appear in the future.

At block 508, I/O performance of block storage system 140 is adjusted based on the I/O load within the third time period in response to determining that the I/O load within the third time period reaches the first predetermined threshold. If the I/O load within the third time period is equal to or greater than the first predetermined threshold, the I/O performance of block storage system 140 can be increased to meet possible I/O spikes, for example, increase an IOPS value from a baseline, or increase an I/O throughput value from a baseline, or modify a dish type in block storage system 140 from a Hard Disk Drive HDD to a Solid State Disk SDD.

In some embodiments, I/O management module 130 may monitor a real-time load of block storage system 140, and lower the I/O performance of block storage system 140 in response to that the real-time I/O load is reduced to a second predetermined threshold. In some embodiments, the second predetermined threshold may be less than the first predetermined threshold. In some embodiments, the second predetermined threshold may be between the baseline and the first predetermined threshold.

In some embodiments, I/O management module 130 may iteratively choose each disk in block storage system 140 to respectively monitor the real-time I/O load of each disk, and lower the I/O performance of each disk in response that the real-time I/O load of each disk is reduced to a corresponding threshold. In some embodiments, corresponding thresholds of the disks may be different. In some embodiments, thresholds of some disks can be the same. In this way, compared with fixedly choosing services with higher scales, this flexible expansion and scaling strategy can reduce the overall cost of block storage for customers. In addition, the I/O performance can be adjusted at the granularity of individual disks. Therefore, it is more flexible and further reduces resource consumption of users.

In some embodiments, I/O scales may include disk types and corresponding parameters of block storage system 140. For example, the I/O scales may include gp3, io2, and io1. The IOPS of a disk with a disk type of gp3 can range from 3000 (baseline) to 15000, and the I/O throughput can range from 125 MiB/s to 1000 MiB/s. A disk with a disk type of io2 may have a maximum IOPS of 64000 and a maximum I/O throughput of 1000 MiB/s. A disk with a disk type of io1 may have a maximum IOPS of 64000 and a maximum I/O throughput of 1000 MiB/s. Therefore, taking a disk with a disk type of gp3 as an example, it can be adjusted within an IOPS range of 3000 to 15000. In some embodiments, the upper limit of I/O performance allowed by block storage system 140 is affected by the size of a single disk. For example, gp3, io2, and io1 are independent. Therefore, adjustment of the I/O performance cannot exceed the corresponding upper limit of each disk.

In some embodiments, a backup setting (such as a backup plan) and a user priority of data backed up by a user in block storage system 140 and from a client can be acquired. Input/Output I/O scales of block storage system 140 that can be allocated to the backup is determined based on the user priority. A time period during which I/O load spikes of block storage system 140 appear is determined based on the backup setting. The I/O performance of the block storage system is improved based on the I/O scales and the time period. In this way, the size and the occurrence time of I/O spikes can be predicted more accurately.

In some embodiments, respective lengths of the first time period, the second time period, and the third time period can be determined by means of the backup setting. For example, if the backup start time and the backup content are planned in the backup setting, data protection product 120 can estimate the I/O spikes and the time required for the backup task based on the data size, bandwidth, transmission speed, and other factors. Moreover, data protection product 120 can determine, based on the prediction, the data amount needed to determine the spike of I/O load in the future when monitoring block storage system 140. The first time period, the second time period, and third time period can be determined according to the data amount needed.

In some embodiments, multiple disks can be chosen in block storage system 140. As an example, suppose block storage system 140 includes disk A, disk B, and disk C, then spikes of respective I/O loads may be determined respectively based on I/O loads for disk A, disk B, and disk C. In some embodiments, different thresholds can be set respectively for disk A, disk B, and disk C based on respective change rates of I/O loads of disk A, disk B, and disk C according to different disk types, and the time of I/O load spikes is determined based on whether the respective change rates of I/O loads of disk A, disk B, and disk C reach respective thresholds.

In some embodiments, if the change rates of the respective I/O loads of disk A, disk B, and disk C are large, the confidence level of the respective change rates of the I/O loads of disk A, disk B, and disk C can be judged again, or the frequencies of the respective change rates of the I/O loads of disk A, disk B, and disk C can be judged additionally. In some embodiments, the I/O load spikes can be determined based on a combination of the confidence level and the change rates. In some embodiments, the I/O spikes can be amended in real time at a more frequent rate.

Method 500 helps a data protection product effectively process I/O spikes without affecting system performance. Moreover, compared with reconfiguring the data protection product to a higher-end model, resource consumption of users is reduced. In addition, in the process of the entire I/O spike and I/O expansion/reduction of disks, the service will not be interrupted, and the user experience is improved.

Figure 6:
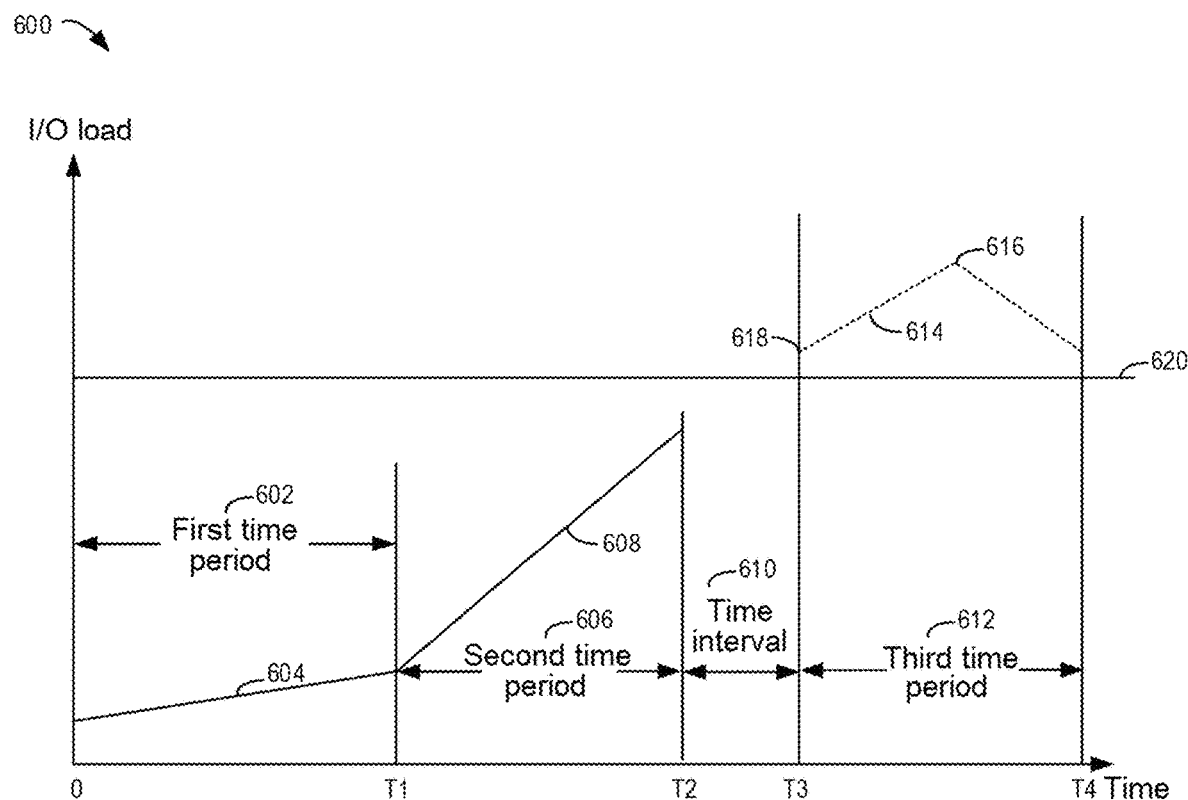
FIG. 6 schematically shows a schematic diagram of monitoring real-time I/O loads according to an example implementation of the present disclosure.

FIG. 6 schematically shows a schematic diagram of monitoring real-time I/O loads according to an example implementation of the present disclosure. As shown in FIG. 6, the horizontal axis represents time, and the vertical axis represents an I/O load. I/O management module 130 can monitor curve 604 of the I/O load within first time period 602 from 0 to T1. I/O management module 130 can monitor curve 608 of the I/O load within second time period 606 from T1 to T2. It can be seen that the gradient of curve 608 is much steeper than that of curve 604. This means that the I/O load has started to grow rapidly in second time period 606.

For the rapid I/O load growth, I/O management module 130 can determine a growth rate of curve 608 relative to curve 604 based on curve 604 and curve 608. In some embodiments, the growth rate can be calculated by means of a mean value of curve 604 and a mean value of curve 608.

If the growth rate is fast, for example, greater than a predetermined threshold, curve 614 of an I/O load within third time period 612 can be predicted. In some embodiments, time interval 610 can be set. The size of time interval 610 can be determined according to needs. For example, the size of time interval 610 can be set equal to the time required to adjust the I/O performance of block storage system 140.

In some embodiments, a mean value of the overall curve can be calculated by taking curve 604 and curve 608 as an overall curve, and mean values of curve 604 and curve 608 can be calculated respectively. In some embodiments, a first variance of curve 604 can be calculated based on the overall curve and curve 604, and a second variance of curve 608 can be calculated based on the mean value of curve 608 and the overall curve.

In some embodiments, curves 604 and 608 can be fitted based on modeling tools, for example, based on the calculated mean value and first variance of curve 604, mean value and second variance of curve 608, and growth rate of curve 608 relative to curve 604, a curve fitting toolbox such as exponential approximation, Fourier approximation, Gaussian approximation, polynomial approximation, and smooth approximation can be used to fit a curve that conforms to the shape of curve 604 and curve 608. Moreover, based on the fitted curve, start time T3 and end time T4 of third time period 612 are brought into the fitted curve, and curve 614 of the I/O load within third time period 612 can be obtained. In some embodiments, the length of third time period 612 can be set or acquired from a user interface of data protection product 120.

In some embodiments, it can be determined that the I/O load of block storage system 140 should be adjusted based on that trough 618 of curve 614 is greater than predetermined threshold 620. The adjusted I/O load can be determined based on spike 616 of curve 614. For example, if the baseline I/O load is 3000 IOPS and spike 616 is 4000 IOPS, the I/O performance of adjusted block storage system 140 can be adjusted as that the allowable IOPS is more than 4000, such as 4500.

Irregular backup tasks can be responded to in a timely manner by means of such a flexible mechanism to monitor I/O loads in real time, and adjust I/O performance of a block storage system in advance based on estimating spikes of I/O load in a future period, thereby preventing I/O throttling and backup service interruption. After the spikes, I/O performance can be lowered, and user resource consumption can be reduced.

Figure 7:
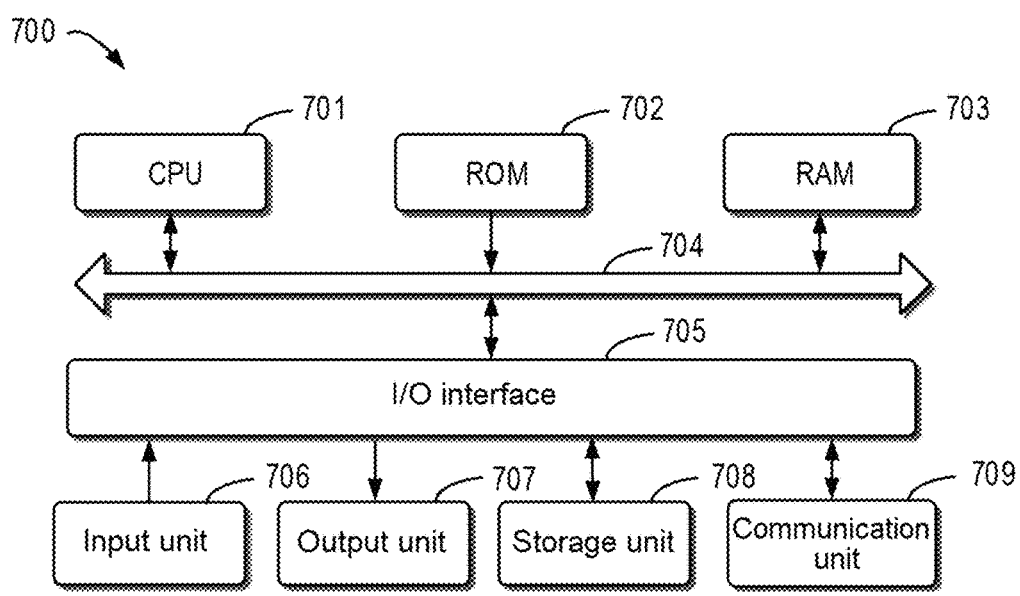
FIG. 7 schematically shows a block diagram of a device for adjusting performance of a block storage system according to an example implementation of the present disclosure.

FIG. 7 illustrates a schematic block diagram of device 700 that may be used to implement embodiments of the present disclosure. Device 700 may be a device or apparatus as described in embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 into random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704. Although not shown in FIG. 7, device 700 may also include a co-processor.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, the method may be implemented as a computer software program that is tangibly included in a machine-readable medium, such as storage unit 708. In some embodiments, part or all of the computer programs may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for adjusting performance of a block storage system, comprising:
monitoring a first input/output (I/O) load set of the block storage system within a first time period and a second I/O load set of the block storage system within a second time period, wherein the block storage system is configured to back up and restore data in a client and has preconfigured predetermined thresholds;
determining a change of an I/O load of the block storage system based on the first I/O load set and the second I/O load set;
determining, based on the change of the I/O load, that an I/O load within a third time period reaches a first predetermined threshold; and
adjusting I/O performance of the block storage system based on the I/O load within the third time period in response to determining that the I/O load within the third time period reaches the first predetermined threshold.

2. The method according to claim 1, further comprising:
monitoring a real-time I/O load of the block storage system; and
lowering the I/O performance of the block storage system in response to that the real-time I/O load is reduced to a second predetermined threshold.

3. The method according to claim 1, wherein monitoring the first I/O load set of the block storage system within the first time period and the second I/O load set of the block storage system within the second time period comprises:
monitoring a third I/O load set of each disk of the block storage system within the first time period; and
monitoring a fourth I/O load set of each disk within the second time period;
and the method further comprises:
determining a change of an I/O load of each disk based on the third I/O load set and the fourth I/O load set; and
adjusting I/O performance for each disk based on the change of the I/O load of each disk.

4. The method according to claim 3, further comprising performing following operations iteratively until all disks in the block storage system are traversed:
choosing a first disk and a second disk in the block storage system, wherein the second disk is different from the first disk;
determining an I/O change of the first disk and an I/O change of the second disk;
determining, based on the I/O change of the first disk and the I/O change of the second disk, that an I/O load increase within a predetermined time period exceeds corresponding thresholds, wherein the corresponding thresholds are different; and increasing I/O performance of the first disk and I/O performance of the second disk.

5. The method according to claim 4, further comprising performing following operations iteratively until all disks in the block storage system are traversed:
monitoring real-time I/O loads of the first disk and the second disk; and
lowering the I/O performance of the first disk and the second disk in response to that the real-time loads are reduced to corresponding thresholds.

6. The method according to claim 1, wherein determining the change of the I/O load of the block storage system based on the first I/O load set and the second I/O load set comprises:
determining, based on the first I/O load set and the second I/O load set, a growth rate of an I/O load within the second time period relative to an I/O load within the first time period;
determining mean values of the first I/O load set and the second I/O load set based on the first I/O load set and the second I/O load set;
determining a first variance of the first I/O load set and a second variance of the second I/O load set based on the first I/O load set, the second I/O load set, and the mean values; and
determining the I/O load change based on the growth rate, the first variance, and the second variance.

7. The method according to claim 6, wherein determining, based on the change of the I/O load, that the I/O load within the third time period reaches the first predetermined threshold comprises:
acquiring a length of the third time period;
acquiring a time interval between the third time period and the second time period;
determining a change of the I/O load within the third time period based on the length, the time interval, and the second I/O load set; and
comparing the change of the I/O load within the third time period with the first predetermined threshold.

8. The method according to claim 1, further comprising:
acquiring a data backup setting and a data backup priority of the client of the block storage system; and
determining the first time period, the second time period, and the third time period based on the data backup setting and the data backup priority.

9. The method according to claim 1, wherein the I/O load comprises at least one of following:
Input/Output Operations Per Second (IOPS); or
I/O throughput.

10. An electronic device, comprising:
a processor; and
a memory coupled to the processor, wherein the memory has instructions stored therein which, when executed by the processor, cause the electronic device to execute actions comprising:
monitoring a first input/output (I/O) load set of a block storage system within a first time period and a second I/O load set of the block storage system within a second time period, wherein the block storage system is configured to back up and restore data in a client and has preconfigured predetermined thresholds;
determining a change of an I/O load of the block storage system based on the first I/O load set and the second I/O load set;
determining, based on the change of the I/O load, that an I/O load within a third time period reaches a first predetermined threshold; and
adjusting I/O performance of the block storage system based on the I/O load within the third time period in response to determining that the I/O load within the third time period reaches the first predetermined threshold.

11. The electronic device according to claim 10, wherein the actions further comprise:
monitoring a real-time I/O load of the block storage system; and
lowering the I/O performance of the block storage system in response to that the real-time I/O load is reduced to a second predetermined threshold.

12. The electronic device according to claim 10, wherein monitoring the first I/O load set of the block storage system within the first time period and the second I/O load set of the block storage system within the second time period comprises:
monitoring a third I/O load set of each disk of the block storage system within the first time period; and
monitoring a fourth I/O load set of each disk within the second time period;
and the actions further comprise:
determining a change of an I/O load of each disk based on the third I/O load set and the fourth I/O load set; and
adjusting I/O performance for each disk based on the change of the I/O load of each disk.

13. The electronic device according to claim 12, wherein the actions further comprise performing following actions iteratively until all disks in the block storage system are traversed:
choosing a first disk and a second disk in the block storage system, wherein the second disk is different from the first disk;
determining an I/O change of the first disk and an I/O change of the second disk;
determining, based on the I/O change of the first disk and the I/O change of the second disk, that an I/O load increase within a predetermined time period exceeds corresponding thresholds, wherein the corresponding thresholds are different; and
increasing I/O performance of the first disk and I/O performance of the second disk.

14. The electronic device according to claim 13, wherein the actions further comprise performing following actions iteratively until all disks in the block storage system are traversed:
monitoring real-time I/O loads of the first disk and the second disk; and
lowering the I/O performance of the first disk and the second disk in response to that the real-time loads are reduced to corresponding thresholds.

15. The electronic device according to claim 10, wherein determining the change of the I/O load of the block storage system based on the first I/O load set and the second I/O load set comprises:
determining, based on the first I/O load set and the second I/O load set, a growth rate of an I/O load within the second time period relative to an I/O load within the first time period;
determining mean values of the first I/O load set and the second I/O load set based on the first I/O load set and the second I/O load set;
determining a first variance of the first I/O load set and a second variance of the second I/O load set based on the first I/O load set, the second I/O load set, and the mean values; and determining the I/O load change based on the growth rate, the first variance, and the second variance.

16. The electronic device according to claim 15, wherein determining, based on the change of the I/O load, that the I/O load within the third time period reaches the first predetermined threshold comprises:
acquiring a length of the third time period;
acquiring a time interval between the third time period and the second time period;
determining a change of the I/O load within the third time period based on the length, the time interval, and the second I/O load set; and
comparing the change of the I/O load within the third time period with the first predetermined threshold.

17. The electronic device according to claim 10, wherein the actions further comprise:
acquiring a data backup setting and a data backup priority of the client of the block storage system; and
determining the first time period, the second time period, and the third time period based on the data backup setting and the data backup priority.

18. The electronic device according to claim 10, wherein the I/O load comprises at least one of following:
Input/Output Operations Per Second (IOPS); or
I/O throughput.

19. A computer program product that is tangibly stored on a computer-readable storage medium and comprises computer-executable instructions, wherein the computer-executable instructions, when executed by a device, cause the device to perform a method, the method comprising:
monitoring a first input/output (I/O) load set of a block storage system within a first time period and a second I/O load set of the block storage system within a second time period, wherein the block storage system is configured to back up and restore data in a client and has preconfigured predetermined thresholds;
determining a change of an I/O load of the block storage system based on the first I/O load set and the second I/O load set;
determining, based on the change of the I/O load, that an I/O load within a third time period reaches a first predetermined threshold; and
adjusting I/O performance of the block storage system based on the I/O load within the third time period in response to determining that the I/O load within the third time period reaches the first predetermined threshold.

20. The computer program product according to claim 19, wherein the method further comprises:
monitoring a real-time I/O load of the block storage system; and
lowering the I/O performance of the block storage system in response to that the real-time I/O load is reduced to a second predetermined threshold.

* * * * *